United States Patent Office

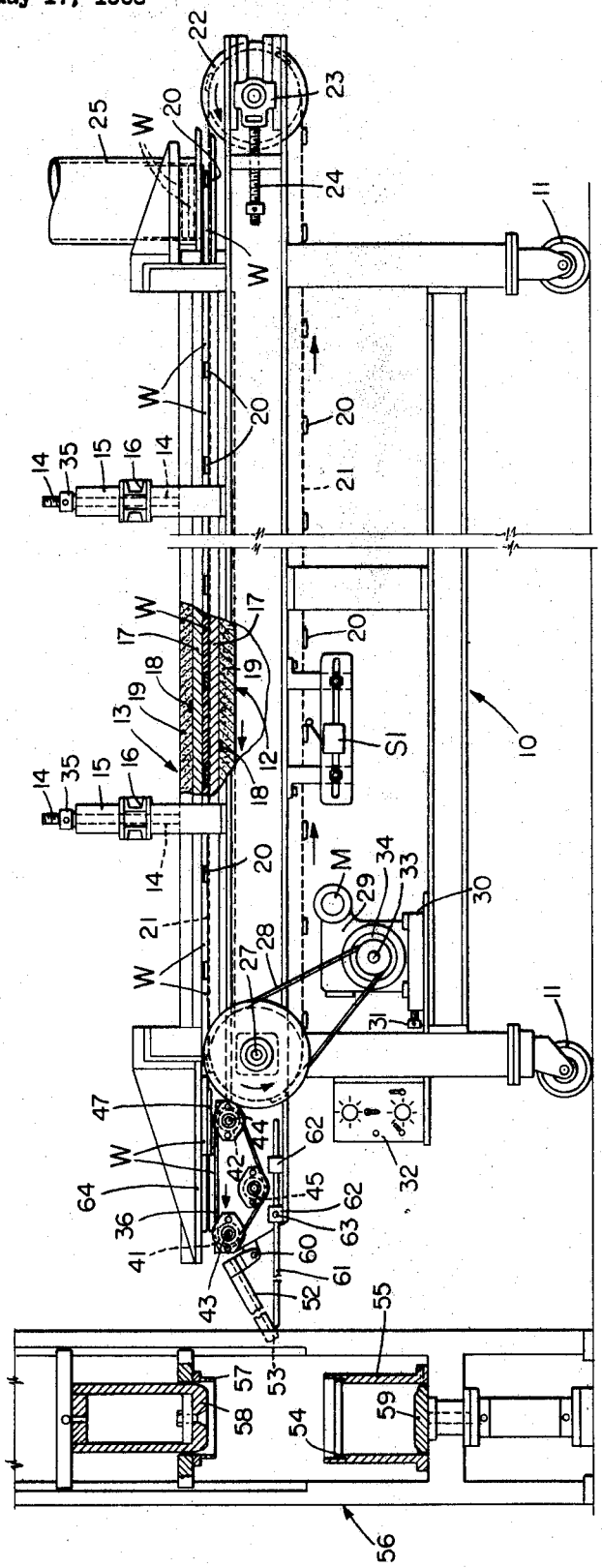

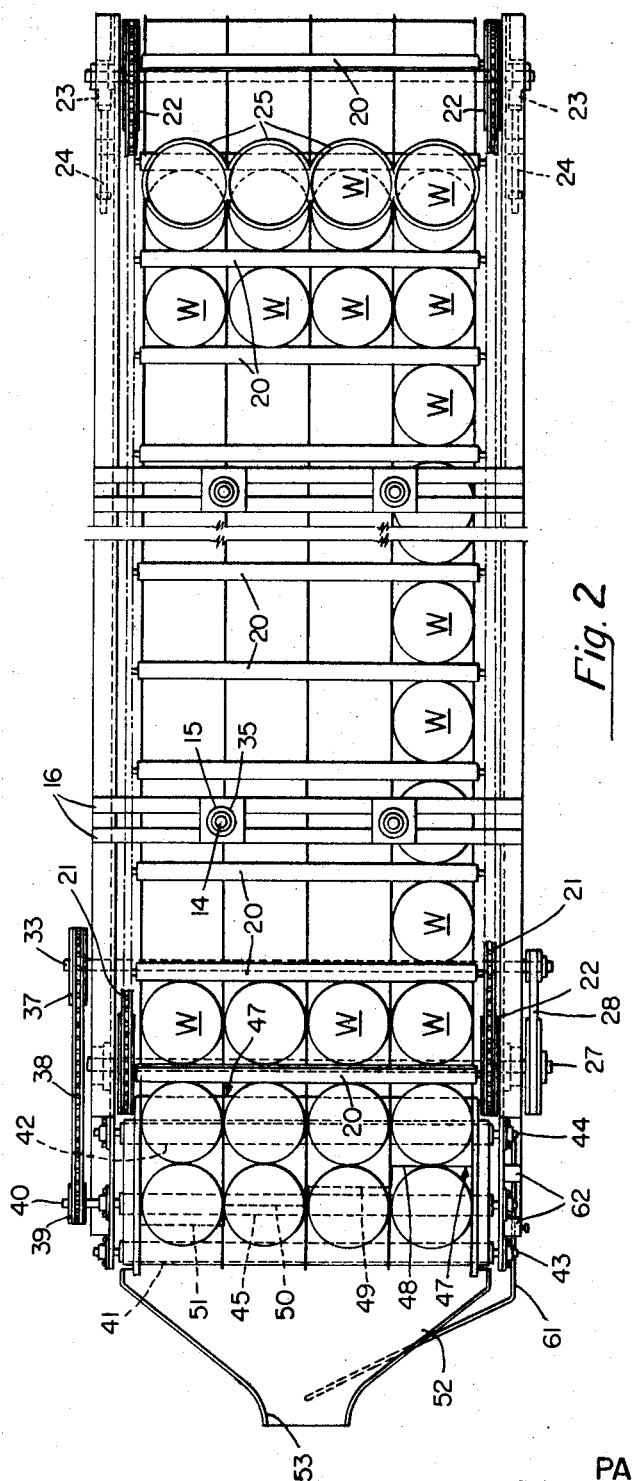

3,502,310
Patented Mar. 24, 1970

---

3,502,310
HOT PLATE BILLET HEATER AND METHOD OF HEATING
Paul M. Coffman, Cherry Hill, N.J., assignor to Shell Oil Company, New York, N.Y., a corporation of Delaware
Filed May 17, 1968, Ser. No. 730,142
Int. Cl. F27b 9/14
U.S. Cl. 263—6  9 Claims

ABSTRACT OF THE DISCLOSURE

This application discloses billet heating apparatus and method employing a billet heater having elongated hot plates which engage and heat an advancing line of billets at closely controlled temperature conditions, releasing the billets at predetermined intervals and, while released, feeding them forward to deliver a leading heated billet for processing.

In a specific embodiment, a plurality of parallel lines of billets are advanced together between common heating plates and a billet is fed out from one of the lines in successive order from the different lines during times when the plates are intermittently separated. This minimizes the length of the apparatus and conserves heat for a given number of billets delivered.

BACKGROUND OF THE INVENTION

Recently there have been developments in the process of forming articles from various plastics in the solid state to avail of their characteristic of being work-strengthenable by fiber-orientation in the "cold" state. Although this is commonly referred to as "cold-working" the characteristic is exhibited at elevated temperatures up to a point near the so-called melting point at which the material begins to change shape without any substantial applied force except gravity and atmospheric pressure, say up to 15-20 p.s.i. The lower end of the "cold-working" range is at the "glass-transition" temperature at which the material becomes brittle and resists flow by an applied force unless quite considerable and maintained for a relatively long time.

These plastic materials are generally of the "memory" type polymers and tend to return toward their pre-shaped form when reheated to a temperature above that at which they were formed. This accounts for the usual preference to "cold-work" the materials at a temperature as near the melting point as possible within their cold-working range wherein they can be greatly strengthened by forced fiber orientation.

If the materials are kept at the elevated temperature for too long a period of time they tend to assume an objectionable bloom.

Therefore, it is desirable to heat the materials as rapidly and as completely as possible and to control the time of heating as closely as possible.

These materials have very low thermal conductivity so that it is difficult to drive heat to the interior of even relatively thin sections sufficiently to provide the desired substantially uniform temperature throughout the plastic body. Obviously, the driving temperature must not be above the melting point lest the outer surface be melted before the center has been heated sufficiently.

Separate heaters for each billet have been tried but this entails an undue number of heating units to obtain a desired high production rate. Open ovens and hot blast heaters have been tried but these do not heat sufficiently rapidly and do not provide the close temperature control of and within the material itself which is so important for effective processing.

SUMMARY OF THE INVENTION

According to the present invention, billets are heated as they are moved progressively through a heating zone and are freed from holding engagement by the heating means whenever they are moved along, the heating means being brought into contact engagement with both main opposite surfaces of the billets at all times except when they are being moved along. In this way the maximum temperature short of the melting point can be maintained to heat the billets under accurately controlled conditions to within 5 to 20 degrees below the melting point and to heat the interior portion of the billets to within about 3 degrees F. of the surface temperature.

Considering, for example, the heating of billets of polypropylene, which melts at about 335° F., having a thickness of about ½" and a diameter of about 12", it has been found that it takes more than one hour to raise the temperature to a desired working point of about 325° F. in a hot air oven at 330° F. with forced air circulation and, even then, the center is not near the surface temperature and the desired temperature cannot be closely maintained generally or for different billets.

By using a surface-contacting heating plate device with the plates having close temperature control at about 325° F. the billets can be heated in about twenty minutes with substantially uniform temperature of about 325° F. of all billets delivered and with an inside temperature within about 3° F. of the outside temperature.

Accurate temperature control can be maintained by using electric resistor heaters for exteriorily insulated heating plates and controlling the heat by thermostats located near the heating surfaces.

By providing means to heat a plurality of advancing parallel lines of billets together, the length and expense of equipment is reduced and efficiency of the heating means is increased.

DRAWINGS

The invention will be described in connection with one form of heating apparatus shown in the accompanying drawings, wherein:

FIG. 1 is a side elevation of billet heating apparatus embodying the invention;
FIG. 2 is a top plan view;
FIG. 3 is a partial elevation showing the upper heating plate raised for the advance of billets.

SPECIFIC EMBODIMENT

The apparatus illustrated comprises a main frame 10 which may be mounted on caster wheels 11 for portability.

A lower heating plate unit 12 is mounted on the main frame and an upper heating plate unit 13 is carried by rods 14 which are adapted to be raised and lowered by a plurality of suitable simultaneously-acting power lift devices 15, such as air piston-cylinder units mounted on cross beams 16 carried by the main frame.

Each heating unit 12, 13 comprises an inner billet-engaging metal plate 17 of good thermal conductivity, as of aluminum or copper, electrical resistor heating elements 18, and cover insulation 19 with such additional metal strengthening covering and rigidfying elements as may be needed. Thermostat temperature control means are provided for each heating plate unit but it is not necessary to illustrate such controls for an understanding of the invention.

Means are provided for moving billets along when the heating plates are separated. Such billet-advancing means may take various forms since the billets remain sufficiently rigid to be pushed in a line from the rear and do not stick to the plates. The term billet includes an advancing sheet or sheets from which separate billets, blanks, or workpieces are cut after heating.

The billet-advancing means herein shown comprises transverse bars 20 (thinner than the billets) secured to endless belt or chain mean 21 carried over end pulleys or sprockets 22. The pulleys at one end are shown to be adjustable for tightening the belts, as by slides 23 and adjusting screws 24.

Billets W are fed in between adjacent pusher bars 20, as by billet stack holding means 25 mounted above the infeed end of the lower heating plate unit, the upper heating plate unit being cut out or foreshortened (as shown) to accommodate the stack holding units.

A shaft 27 carrying the feed conveyor pulleys 22 at the feed-out or delivery end is driven by a belt or sprocket chain 28 from a gear box unit 29 driven by a motor M and passing over suitable pulleys or sprockets. The gear unit is shown to be mounted on a slide 30 adjusted by a screw 31 to control tension in the belt or chain 28.

A control unit 32 is provided for regulating the speed, timing, and torque of the motor drive. This control unit will provide means for synchronizing the action of the plate lifting and lowering means 15 with the action of the billet feed means. The drive shaft 33 of the gear unit is provided with a magnetic clutch-brake unit 34 with slip to avoid over-action on the conveyor after the upper heating plate has been lowered upon the billets. If desired, a limit switch S1 may be provided for engaging a conveyor bar 20 or other projection to stop the conveyor accurately in position each time the bar reaches a given position, hereafter every fourth forward movement when four billets are fed abreast for a distance of ¼ billet diameter at each advance, the starting means overriding the switch S1 for the next advance. If desired, the conveyor belt can be provided with switch operating elements throughout its length for each and every stop in the conveyor movement. The switch S1 is preferably mounted for longitudinal adjustability along the conveyor path to provide a jump feed when billets are not of the same length as spaces between conveyor bars.

If desired, adjustable stops 35 may be provided on the upwardly projecting ends of the lift rods 14 to limit the weight on the billets if they are of a nature to be deformed by the weight of the heating plate unit.

Means are provided for taking away the heated billets as delivered but at a higher travel speed to cause them to move the greater required distance while the main conveyor means is operating. Of course, separate drive means might be provided; but it is considered preferable to drive a take-off conveyor 36 from the drive shaft 33 of the gear box, as by a large pulley or sprocket 37 and a belt or chain 38 driving a pulley 39 of a shaft 40.

The take-off belt 36 is carried by pulleys or sprockets 41, 42 on shafts 43, 44 and is driven by a pulley or sprocket 45 on the shaft 40. As here shown, the take-off conveyor is driven whenever the gear box shaft 33 is driven. If the motor is started and stopped for each feed movement of the billet-feed conveyor 21 the off-take conveyor will likewise be started and stopped; but it is permissible for the take-off conveyor to move continuously if the motor and gear box operate continuously. Preferably, in any case, the billet-engaging surface is made to have a low-friction coefficient with the billets, as by coating with polytetrafluoroethylene (PTFE), for example for polypropylene blanks, or other low-friction material for other type blanks, to avoid any substantial forward-moving action on the billet until it has dropped fully and completely on the take-off conveyor.

An auxiliary delivery plate 47 is provided to take billets from the main conveyor and carry them, as pushed from behind, to the off-take conveyor 36, the plate 47 being stepped, as at 48, 49, 50, 51, to deliver billets in succession to the take-off belt. This is applicable to billets which are fed abreast, as shown; if billets should be fed in stepped (oblique) relationship the feed-off plate could have a straight end instead of a stepped end. When there are four longitudinal rows of billets, as shown, the forward feed at each feeding step will be one-quarter of the diameter or length of a billet. For more or less rows the increment of feed would be proportional to the number of rows.

The take-off belt 36 delivers billets to a chute 52 which brings them into a single line, as at the outlet 53, for transfer to processing means, here to the seat 54 of a die-mold portion 55 of a forming press 56 having a clamping plunger 57 and a forming plunger 58 cooperating with a bottom plunger 59. The chute may be made adjustable, as by mounting at a pivot 60 and shifting position by an adjusting rod 61 operating in guides 62 and held by set screws 63.

Billets are enclosed and, if desired, kept heated, as by a hood 64 carried by the main frame above the delivery plate 47 and take-off conveyor 36. The notched feed-off plate 47 could also be heated if desired. The space between the hood plate 64 and the delivery plate 47 is just enough to allow for billet thickness in passage so that billets which have been partly pushed off the plate 47 will not tilt over until they have been fully pushed off the plate 47. If desired, one or both of the plates 64 or 47 may be mounted for adjustment relative to the other to accommodate billets of different thicknesses.

In operation and first assuming that a heater for only a single line of billets is used and that the line of billets has been heated and ready to be fed to a processing device, such as the press illustrated, the upper heating plate unit is lifted and the conveyor is operated to feed out the end heated billet to the press, whereupon a new billet is fed in at the intake end and the heating plate unit is lowered on the line of billets.

When there are several lines of billets, as shown herein, the length of forward feed is approximately equal to billet length or diameter divided by the number of lines, here ¼ diameter, so that a billet is fed out from one of the several lines in succession at each separation of the heating plates.

When only a single line is present, it may be desirable to dispense with the feed-out plates 64 and 47, the issuing billet falling directly off the main conveyor into a chute and from that to delivery; but when several lines are present and some of the end billets overhang at their ends, say by ¼, ½, or ¾ of their length, the delivery plates and delivery conveyor are useful to avoid deformation of the billets if they are soft enough to bend.

It will be seen that the invention provides improved apparatus and method for quickly, thoroughly, and accurately heating billets which have a low coefficient of thermal conductivity and which may be injuriously affected by prolonged or excessive heating.

While one embodiment of the invention has been described for purposes of illustartion, it will be understood that there may be various embodiments and modifications within the general scope of the invention.

What is claimed is:

1. Apparatus for heating flat billets, comprising in combination, a lower longitudinally extending contact heating means adapted to support said billets and conduct heat to their lower surfaces, upper longitudinally extending contact heating means adapted to contact and conduct heat to the upper surfaces of said billets, said upper and lower contact heating means being adapted to receive a line of said billets between them, means for intermittently moving at least one of said contact heating means to increase and decrease the space between them, and means for intermittently advancing a line of said billets between said heating means when the space between them has been increased.

2. Apparatus for heating billets, comprising in combination, spaced longitudinally extending heating means arranged to receive a plurality of parallel lines of billets between them, means for intermittently moving at least one of said spaced heating means to increase and decrease the space between them means for intermittently advancing said lines of billets between said heating means when the space between them has been increased, and means for delivering a billet from each of said lines in succession for each forward billet feeding action.

3. Apparatus as set forth in claim 2, wherein billets of the plural lines are fed abreast, and wherein said delivery means includes a stepped end support for the end billets of the several lines.

4. Apparatus as set forth in claim 2, wherein said delivery means includes a supplemental delivery conveyor having a higher travel speed than said billet advancing means.

5. Apparatus as set forth in claim 3, wherein said delivery means includes a supplemental delivery conveyor having a billet supporting surface of relatively low coefficient of friction with the billets whereby to minimize billet movement until a billet is wholly supported on the delivery conveyor.

6. Apparatus for heating billets, comprising in combination, spaced longitudinally extending heating means arranged to receive a line of billets between them, means for intermittently moving at least one of said spaced heating means to increase and decrease the space between them, means for intermittently advancing a line of billets between said heating means when the space between them has been increased, and supplemental billet supporting and covering means located beyond the delivery end of said spaced separable heating means.

7. Apparatus as set forth in claim 6, wherein said supplemental billet supporting means is stepped to feed billets successively from the plural lines, and which further includes a supplemental feed-off conveyor and a common delivery chute.

8. The method of heating flat billets of plastic polymer material having a low coefficient of heat transfer which comprises engaging at least one line of the billets supported on the lower of separable longitudinally extended upper and lower heating plates during a plurality of operating cycles which consist of a heating phase and a billet-moving phase, maintaining said upper and lower heating plates in heat conducting contact with the upper and lower surfaces, respectively, of said billets during said heating phases and feeding at least one line of billets forward during said billet-moving phases while the heating plates are separated.

9. The method as set forth in claim 8, which includes, feeding a plurality of lines of billets between said heating plates and feeding out a billet separately from each of said lines at each separation of the plates.

References Cited

UNITED STATES PATENTS 2,530,680 11/1950 Burkholder _____ 263—8 X
3,322,413 5/1967 Orth _____ 263—6

JOHN J. CAMBY, Primary Examiner

U.S. Cl. X.R.

219—10.69